(12) United States Patent
Pani (10) Patent No.: US 8,849,949 B1
(45) Date of Patent: Sep. 30, 2014

(54) PROVIDING PROXY SERVICE DURING ACCESS SWITCH CONTROL PLANE SOFTWARE UPGRADE

(75) Inventor: Ayaskant Pani, Fremont, CA (US)

(73) Assignee: Google Inc., Mountain View, CA (US)

( * ) Notice: Subject to any disclaimer, the term of this patent is extended or adjusted under 35 U.S.C. 154(b) by 253 days.

(21) Appl. No.: 13/344,397

(22) Filed: Jan. 5, 2012

(51) Int. Cl.
*G06F 15/16* (2006.01)

(52) U.S. Cl.
USPC ............ 709/217; 709/204; 709/220; 717/168

(58) Field of Classification Search
CPC ............ H04L 63/0245; H04L 63/0263; H04L 63/1416
USPC ............................ 709/204, 217, 220; 717/168
See application file for complete search history.

(56) References Cited

U.S. PATENT DOCUMENTS

| 7,804,806 | B2 * | 9/2010 | Borkar et al. ................. 370/338 |
| 2007/0220358 | A1 * | 9/2007 | Goodill et al. ................. 714/43 |
| 2012/0239744 | A1 * | 9/2012 | Yonge et al. ................. 709/204 |
| 2013/0054761 | A1 * | 2/2013 | Kempf et al. ................. 709/220 |

* cited by examiner

*Primary Examiner* — Yves Dalencourt
(74) *Attorney, Agent, or Firm* — Foley & Lardner LLP; Edward A. Gordon (57) ABSTRACT

Systems and methods utilize the data plane of an access switch to aid in providing control plane proxy services when the access switch is undergoing a software upgrade on its control plane. In one aspect, a method includes providing a peer switch with current state information of the host computer, encapsulating a control plane query packet sent from the host computer using a first hardware circuit of the access switch, forwarding the encapsulated control plane query packet to the peer switch using the first hardware circuit. The method further includes receiving a response to the control plane query packet from the peer switch using the first hardware circuit and directing the response to the host computer.

38 Claims, 4 Drawing Sheets

PROVIDING PROXY SERVICE DURING ACCESS SWITCH CONTROL PLANE SOFTWARE UPGRADE

FIELD OF THE DISCLOSURE

The present disclosure relates generally to access switches and in particular to using the data plane of an access switch to aid in providing control plane proxy service during a control plane software upgrade.

BACKGROUND OF THE INVENTION

An access switch, or an edge switch, is an electronic device that provides connectivity between computers and computer networks. For example, a host computer can use an access switch to communicate with another computer in a network, such as a local area network (LAN), or other external networks, such as the Internet. Access switches have two levels of operation, the control plane and the data plane. The data plane is responsible for receiving data packets from the host computer and forwarding the packets to other switches or network devices. The control plane is responsible for managing addresses within the network and communications protocols. For example, a control plane query packet can be sent from a host computer that is encoded in a particular communications protocol. The control plane of the access switch can interpret the query packet and send an appropriate response. Communications protocols are systems of digital message formats and rules for exchanging messages between computing systems.

The software of the control plane may be upgraded. During an upgrade of the control plane, the access switch cannot provide control plane service for the host computer so an end user on the host network will experience a network service disruption. One possible solution is to reprogram the operating system kernel of each host computer to respond to a notification of a control plane software upgrade by an access switch by, for example, adjusting the timeouts of various communications protocols. Thus, during the interim period, a host computer avoids sending any control plane messages to the access switch. However, kernels in different host computers are not standardized and so it is difficult and time-consuming to reprogram all the kernels.

SUMMARY OF THE INVENTION

Aspects of the invention use the data plane of an access switch undergoing a control plane software upgrade to aid in providing control plane proxy service for that access switch so that a host computer does not experience a service disruption. Since the data plane circuitry on the access switch is not affected by the control plane software upgrade, it can be utilized to help maintain control plane services for the host computer. In one aspect, a method of providing control plane proxy service for an access switch serving a host computer is disclosed. The method includes providing a peer switch with current state information of the host computer, encapsulating a control plane query packet sent from the host computer using a first hardware circuit of the access switch, forwarding the encapsulated control plane query packet to the peer switch using the first hardware circuit. The method further includes receiving a response to the control plane query packet from the peer switch using the first hardware circuit and directing the response to the host computer.

In another aspect, a method of upgrading the control plane software of an access switch is disclosed. The method includes identifying a peer switch that can provide proxy service to the access switch and providing the peer switch with current state information of a host computer. The method further includes directing, while the access switch is being upgraded, a control plane query packet from the host computer to the peer switch by using a first hardware circuit of the access switch. The method further includes receiving, while the access switch is being upgraded, a response to the control plane query packet from the peer switch using the hardware circuit. The method further includes directing, while the access switch is being upgraded, the response to the host computer and stopping proxy service when the access switch has finished upgrading.

In another aspect, a computing network system is disclosed. The system includes a plurality of host computers and a plurality of access switches. During a control plane software upgrade of a first access switch in the plurality of access switches, the first access switch is configured to receive a control plane query packet from a first host computer in the plurality of host computer, direct the control plane query packet to a second access switch using a first hardware circuit of the first access switch, receive a response to the control plane query packet from the second access switch using the first hardware circuit, and send the response to the first host computer.

In another aspect, a non-transitory computer readable medium is disclosed for storing computer executable instructions, which, when executed by a processor, cause the processor to carry out a method for upgrading the control plane software of an access switch. The non-transitory computer readable medium includes instructions to identify a peer switch that can provide proxy service to the access switch, and instructions to provide the peer switch with current state information of a host computer. The non-transitory computer readable medium further includes instructions to direct, while the access switch is being upgraded, a control plane query packet from the host computer to the peer switch by using a first hardware circuit of the access switch, and instructions to receive, while the access switch is being upgraded, a response to the control plane query packet from the peer switch using the hardware circuit. The non-transitory computer readable medium further includes instructions to direct, while the access switch is being upgraded, the response to the host computer, and instructions to stop proxy service when the access switch has finished upgrading.

BRIEF DESCRIPTION OF THE DRAWINGS

The systems and methods may be better understood from the following illustrative description with reference to the following drawings in which.

DETAILED DESCRIPTION

To provide an overall understanding of the invention, certain illustrative embodiments will now be described, including methods for using the data plane of an access switch to aid in providing control plane proxy service during a software upgrade of the control plane. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
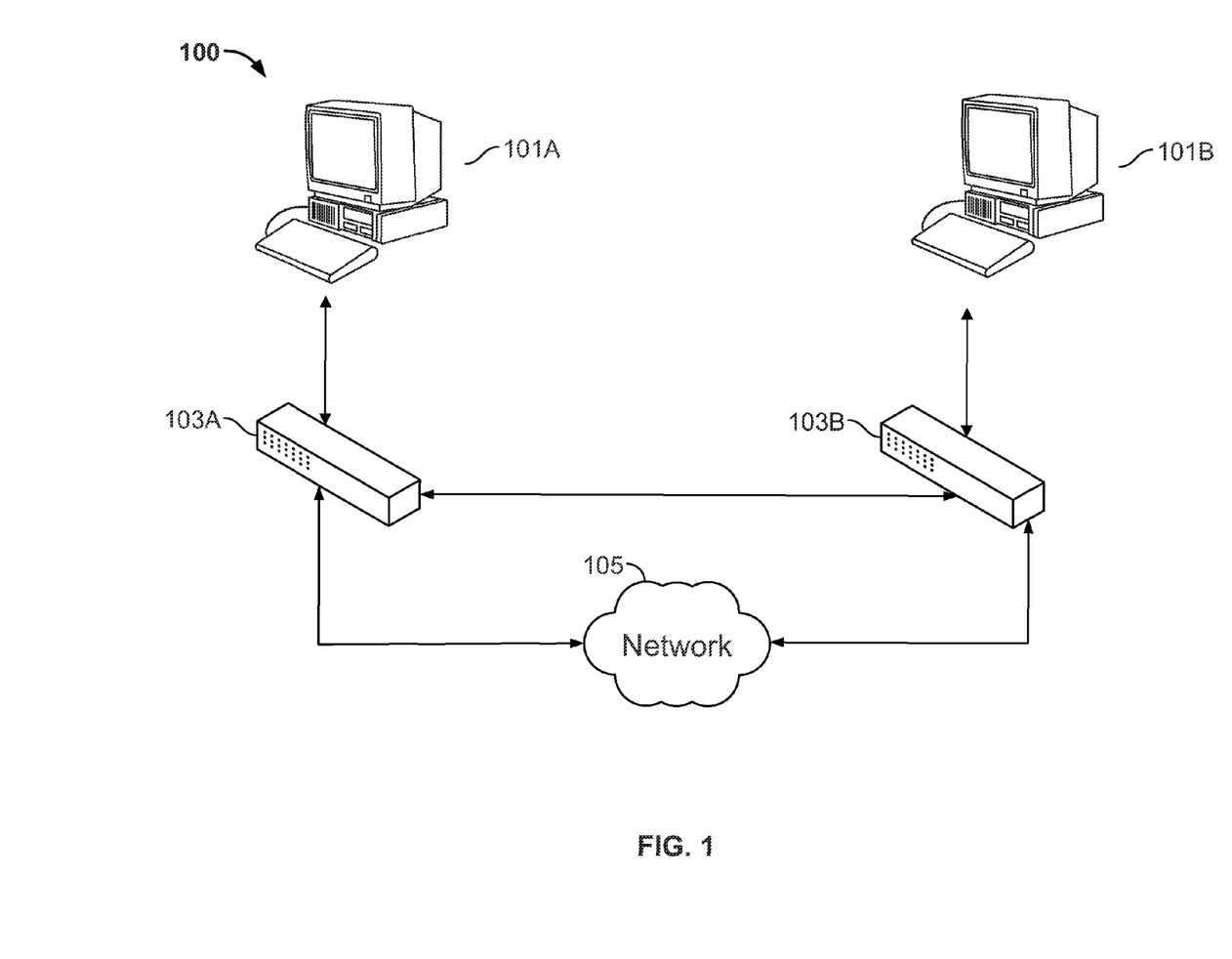
FIG. 1 shows a general networking system including access switches in accordance with an embodiment of the invention.

In order to describe systems and methods of using the data plane of an access switch to aid in providing control plane proxy service during a software upgrade of the control plane, a general networking system is first described. FIG. 1 shows a general networking system 100 that includes host computer 101A and 101B, access switches 103A and 103B providing switch service to host computers 101A and 101B respectively, and other networks 105. Host computers 101A and 101B may be desktop computers, laptop computers, servers, or any other network device. Networks 105 include any number of other networks, including LANs, wide area networks (WANs), and the Internet. Access switches 103A and 103B enable host computers 101A and 101B to communicate with each other and to the other networks 105.

The control plane of access switches 103A and 103B store communications protocol information and handles protocol and address requests from host computers 101A and 101B respectively. For example, host computer 101A may send a query packet to access switch 103A to resolve the MAC address for an IP address of the access switch. Access switches 103A and 103B can also handle queries sent by host computer 101A and 101B that are encoded in specific communications protocols such as ARP, LACP, and LLDP. The accesses switches are enabled to interpret the protocol queries and generate responses. Communications protocols that can be handled by the access switches include, but are not limited to, the address resolution protocol (ARP), link aggregation control protocol (LACP), and link layer discovery protocol (LLDP).

The control plane of access switches 103A and 103B contain state information relating to protocols used by a host computer or addresses that the host computer has communicated with. This state information may include, for example, the protocol state of various ports channels connected to the host computer, the media access control (MAC) addresses corresponding to various IP addresses, and the IP addresses for which an access switch provides proxy MAC service. Access switches 103A and 103B may update its state information to include responses to queries or updates to protocol states. The access switches can use the state information to aid in responding to future query packets. Data packets are handled by the data plane of the access switches.

Figure 2:
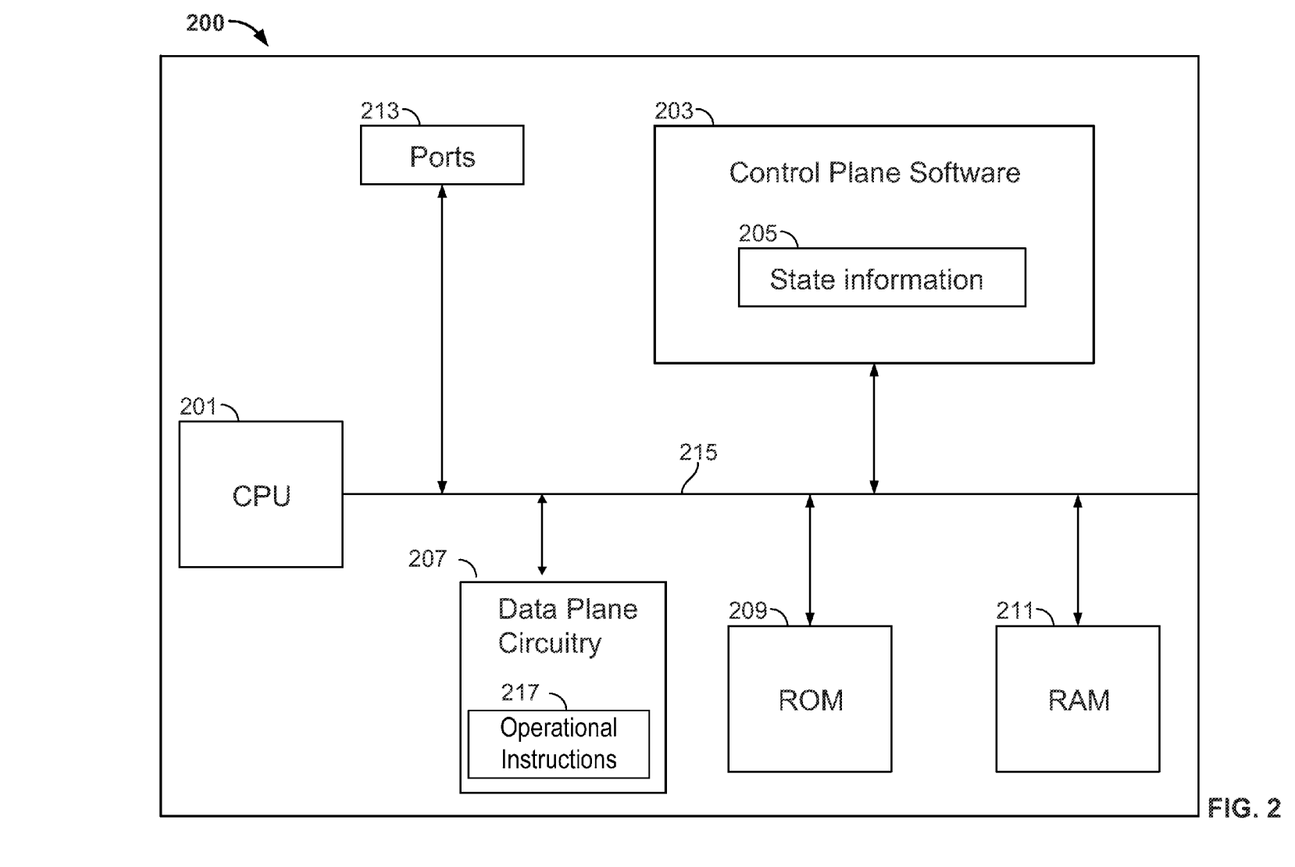
FIG. 2 shows an access switch in accordance with an embodiment of the invention.

The components of an access switch are now described. FIG. 2 depicts an access switch 200 and some of its components. An access switch may include a central processing unit (CPU) 201, control plane software 203 including state information 205, data plane circuitry 207, ROM 209, RAM 211, communications ports 213, and bus 215. Bus 215 allows the other components to communicate with each other. Control plane software 203 is stored on a computer readable medium in access switch 200 and contains functions and instructions to allow access switch 200 to provide control plane services to a host network. Control plane software 203 also stores state information 205. State information 205 includes, for example, information relating to protocols used by a host computer or addresses that the host computer has communicated with. The data plane circuitry 207 implements the data plane in switch 200 and can, for example, forward data packets from a host computer to another network device. CPU 201 can program data plane circuitry 207 to perform additional functions by configuring operational instructions 217 located within the data plane circuitry. Data plane circuitry 207 may be implemented in an application specific integrated circuit (ASIC) or other types of dedicated hardware, or even in configurable hardware such as a field programmable gate array (FPGA). There may be other components in access switch 200 not illustrated in FIG. 2.

Computer-readable media suitable for storing computer program instructions and data, such as control plane software 203 and operational instructions 217, include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Figure 3:
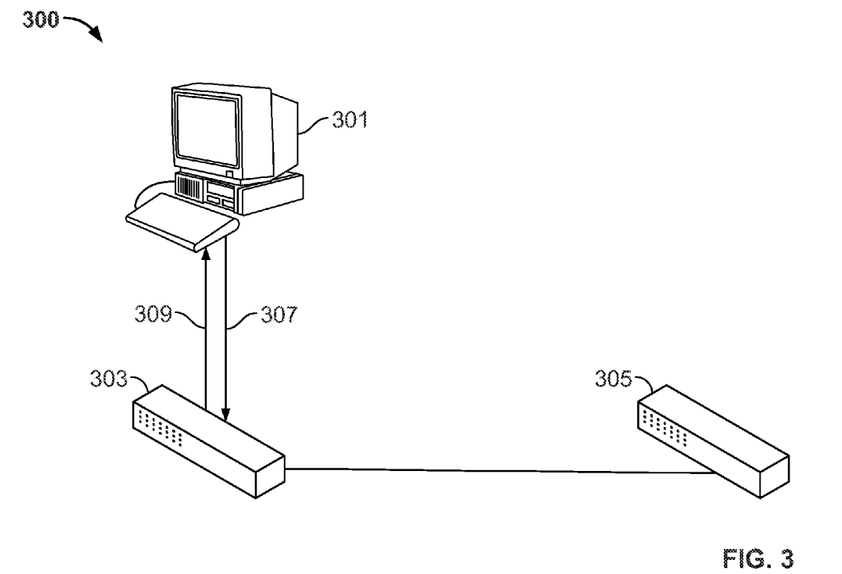
FIG. 3 shows an access switch providing service to a host computer in accordance with an embodiment of the invention.

The normal operation of an access switch is now described. FIG. 3 shows a host computer 301 and an access switch 303. Access switch 303 may serve host computer 301 exclusively or could also serve a number of other host computers. Access switch 303 has a number of peer switches that it can communicate with, for example peer switch 305. A peer switch is a switch that is directly connected to access switch 305 or indirectly connected within a LAN. These peer switches serve other host computers or network devices. Access switch 303 has data plane circuitry that implements the data plane functions of the access switch, for example forwarding data packets from host computer 301 to other switches and network devices. Access switch 303 also has control plane software that provides communications protocol services to host computer 301. These services include receiving and responding to protocol query packets, address requests, and other control plane requests sent from host computer 301. For example, host computer can send a query packet 307 to access switch 303. The query packet may be a request to identify an address of another port on a network device, or a query encoded in a specific communications protocol, such as ARP, LACP, or LLDP. Access switch 303 processes the query packet 307 and returns a query response 309 to host computer 301. The query response 309 may be the address of a port on a network device or a response encoded in a specific communications protocol. Access switch 303 may have the appropriate response to query packet 307 stored in memory, for example within state information 205 in FIG. 2. The access switch may need to request information from other network devices, such as peer switch 305. In this manner, the access switch provides control plane services to host computer 301. If the control plane software of access switch 303 needs to be updated, access switch 303 will not be able to provide control plane service to host computer 301 during the upgrade. The data plane of access switch 303 can still operate normally during a software upgrade of the control plane, but the control plane is non-functional. Aspects of the invention utilize the data plane of access switch 303 to aid in providing control plane proxy service with a peer switch so that host computer 301 is provided with control plane services.

Figure 4:
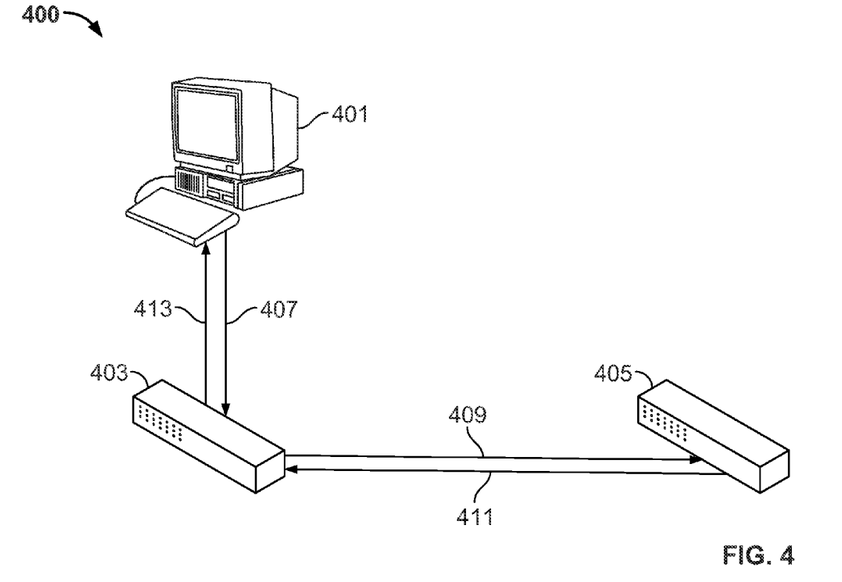
FIG. 4 shows a peer switch providing proxy service to a host computer in accordance with an embodiment of the invention.

Systems and methods are herein described for using the data plane of an access switch to aid in providing control plane proxy service when the access switch is undergoing a control plane software upgrade. FIG. 4 shows a host computer 401 and an access switch 403. Access switch 403 may serve host computer 401 exclusively or could also serve a number of other host computers. Access switch 403 has a number of peer switches that it can communicate with, for example peer switch 405. When a control plane software upgrade is scheduled for access switch 403, access switch 403 sends a request to a peer switch to provide proxy service for host computer 401 and any other host computers that access switch 403 may serve. For example, access switch 403 may send a request for proxy service to all its peer switches, either directly or indirectly by forwarding the request within the LAN if the access switch does not know the address of all the peer switches. A peer switch 405 accepts the request to provide proxy service for access switch 403 and sends access switch 403 its address. Access switch 403 sends peer switch 403 the current state information stored in peer switch 403. The state information may include for example, information relating to protocols used by a host computer or addresses that the host computer has communicated with. Without the current state information, peer switch 405 cannot successfully provide responses to control plane queries sent from host computer 401.

Access switch 403 has data plane circuitry that provides data plane services for host computer 401. The data plane circuitry of access switch 403 can be programmed by the access switch to additionally aid in providing control plane proxy service during the software upgrade. The data plane circuitry in access switch 403 is configured to redirect control plane queries from access switch 403 to peer switch 405 during a control plane software upgrade on access switch 403. The data plane circuitry is a hardware component, so it is not affected by the control plane software upgrade. The CPU of access switch 403 configures the data plane circuitry before the upgrade begins. The data plane circuitry provides query packet redirection by intercepting control plane query packets 407 sent by host computer 401. The data plane circuitry encapsulates the query packet with a header that includes the address of access switch 403 as the source address and the address of peer switch 405 as the destination address. The header may also include other information about the query packet, the access switch, or the peer switch. For example, the header may contain the ingress physical port number of the access switch. The encapsulated query packet 409 is then directed to peer switch 405. The process of encapsulating a packet and forwarding it can be termed "tunneling." One method to implement tunneling between an access switch and a peer switch is to use the General Routing Encapsulation (GRE) protocol. For example, GRE encapsulation provides an additional header file called a GRE KEY which can be exploited to encode an ingress port number of the access switch. An ASIC with flexible rewriting capabilities can also be used to implement tunneling.

Peer switch 405 also has data plane circuitry that normally engages in providing data plane services to its hosts. When peer switch 405 is elected to provide proxy service to access switch 403, the CPU of peer switch 405 configures its data plane circuitry to receive encapsulated query packet 409 and decapsulate it (i.e. remove the header). Once decapsulated, the control plane of peer switch 405 generates a response to the query packet. Peer switch may look up the current state information provided to it by access switch 403 to generate a response, or may communicate with other network devices to generate the response. The control plane of peer switch 405 sends the response to its data plane circuitry, which tunnels the response packet back to access switch 403. The tunneling includes encapsulating the response packet in a header with the address of the access switch 403 as the destination address and the address of the peer switch 405 as the source address, and sending the encapsulated response packet 411 to access switch 403. When received, the data plane circuitry of access switch 403 decapsulates the response packet and forwards the response packet 413 to host computer 401. Thus the data planes of access switch 403 and peer switch 405 can aid in setting up and providing control plane proxy services for the access switch during a software upgrade of the control plane.

After the upgrade is complete, access switch 403 will reboot to complete the installation of new control plane software. The access switch 403 will disable the tunneling function in its data plane circuitry so that it no longer encapsulates and forwards query packets to peer switch 405. Access switch 403 will also send a message to peer switch 405 to cease providing proxy service. Access switch 403 must first re-determine the address of peer switch 405 after the reboot. For example, the address of peer switch 405 may be stored in memory that is not affected by the upgrade and reboot, or the access switch can decode the address of peer switch 405 from the data plane circuitry used to encapsulate the control plane packets during proxy service. Upon receipt, peer switch 405 will disable the tunneling function in its data plane circuitry. Peer switch 405 may also provide updated state information to access switch 403, especially if peer switch 405 updated or modified the state information during the period of time it was providing proxy service. Access switch 403 can now provide normal control plane services to host computer 401. In this manner, the data plane of access switch 403 can aid in providing control plane proxy services for the access switch during a software upgrade of the control plane.

Figure 5:
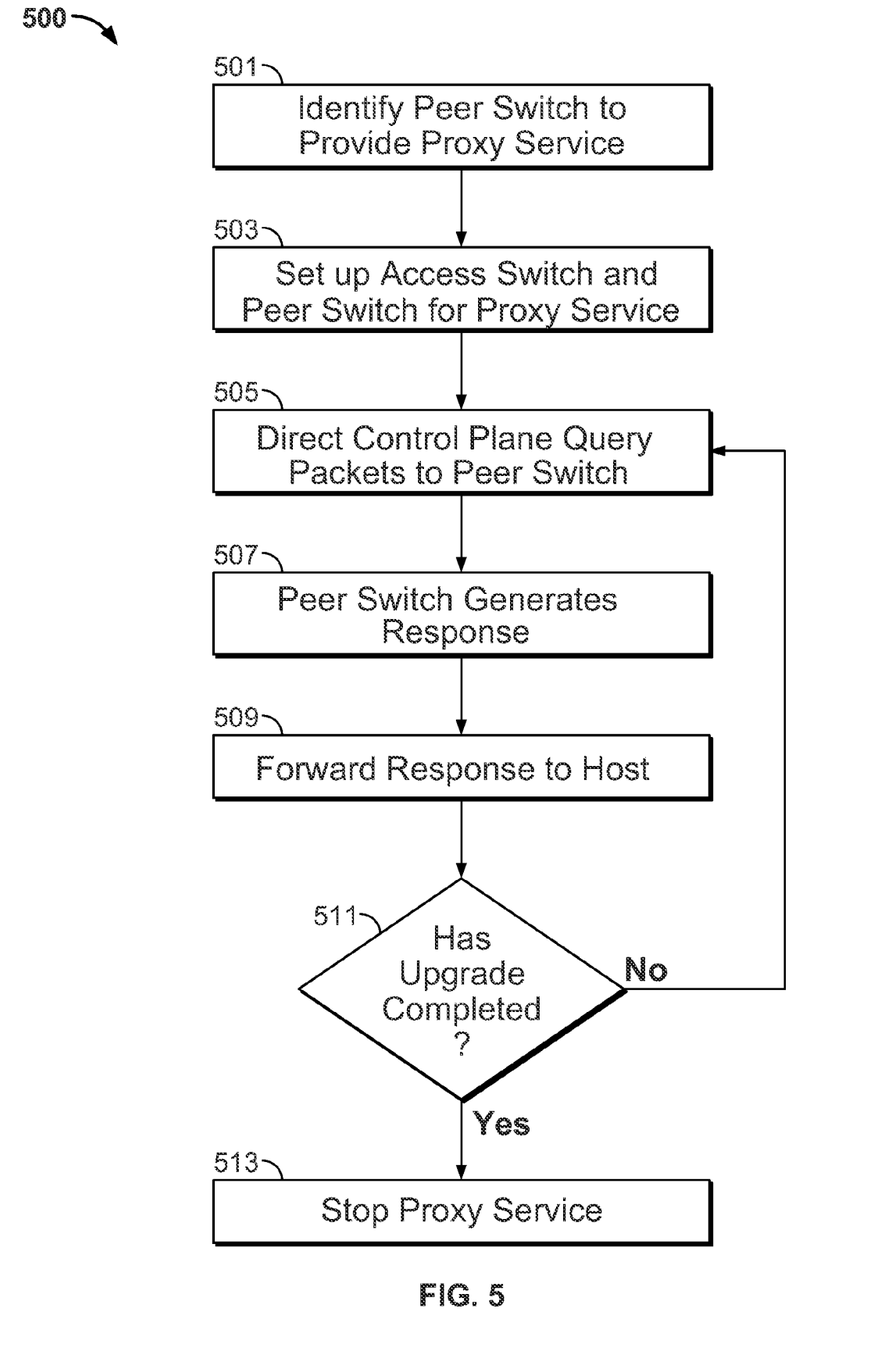
FIG. 5 show a method of providing proxy service to an access switch in accordance with an embodiment of the invention.

FIG. 5 shows a flow chart depicting a method 500 of using the data plane of an access switch to aid in providing control plane proxy services for the access switch during a software upgrade of the control plane. The method includes identifying a peer switch to provide proxy service and providing the peer switch with current state information. The access switch uses its data plane to encapsulate and forward all control plane query packets from a host computer to the peer switch for processing. The peer switch will send a response back to the data plane of the access switch, which will send the response to the host computer. Once the control plane upgrade has completed, the access switch ceases the proxy service and provides normal service to the host computer. The host computer is not aware that a peer switch is providing service and so there is no service disruption. This method can be performed on a variety of host-switch network systems, for example system 400 in FIG. 4. Method 500 can be implemented as instructions on a non-transitory computer readable medium within the data plane circuitry of an access switch.

Method 500 begins when an access switch is about to undergo a control plane software upgrade. The access switch will identify a peer switch to provide proxy service for the access switch while it is upgrading, illustrated as step 501. The access switch will send a proxy request to one or more peer switches within a LAN. A peer switch is a switch that is directly connected to the access switch or indirectly connected within a LAN. A peer switch may respond to the proxy request if it has enough system resources, like memory, to provide proxy service. The peer switch sends the access switch its address. The peer switch will provide proxy control plane services to any host computers that the access switch serves.

Once a peer switch has been identified, the access switch and the peer switch are set up to provide proxy service, illustrated as step 503. The access switch and the peer switch both have data plane circuitry which normally provides data plane services to their respective host computers. The access switch will program its data plane circuitry to set up a tunnel between the access switch and the peer switch. The tunnel functions by intercepting and encapsulating any control plane query packets sent from the host computer and forwarding the packets to the peer switch. The tunnel may be implemented using a flexible rewriter in the data plane circuitry, or using the GRE tunneling protocol, or any other methods known to provide packet encapsulation and forwarding. The data plane circuitry is able to provide this tunneling service because it is a hardware component and is not affected by the control plane software upgrade on the access switch. The data plane circuitry of the peer switch is also programmed to receive encapsulated packets from the access switch and decapsulate them, and encapsulate any response packets the peer switch generates to send back to the access switch. The access switch will also send the peer switch the current state information stored on the access switch. The current state information includes for example, information relating to protocols used by a host computer or addresses that the host computer has communicated with.

When a host computer sends a control plane query packet to the access switch during the upgrade, the data plane circuitry of the access switch intercepts the query packet. The data plane circuitry encapsulates the query packet with a header, which includes the address of the access switch as the source address and the address of the peer switch as the destination address. The header may include other information relating to the query packet, the access switch, or the peer switch. For example, the header may contain the ingress physical port number of the access switch. The encapsulated packet is then sent to the peer switch through the tunnel set up between the access switch and the peer switch, illustrated as step 505.

When the peer switch receives the encapsulated packet, the data plane circuitry of the peer switch decapsulates the packet. The control plane of the peer switch can then process the query and formulate a response packet, shown as step 507. The peer switch may use the current state information sent by the access switch or query other network devices to formulate the response. The data plane circuitry of the peer switch encapsulates the response packet with a header and sends the encapsulated response packet to the access switch, shown as step 509. The header includes the address of the access switch as the destination address and the address of the peer switch as the source address. The header may include other information relating to the query packet, the access switch, or the peer switch. For example, the header may contain the ingress physical port number of the access switch. The data plane circuitry of the access switch receives the encapsulated response packet and decapsulates it. The response packet is then forwarded to the host computer.

The proxy service provided by the peer switch in steps 505, 507, and 509 continues until the control plane software of the access switch has completed its upgrade, shown as step 511. While the upgrade is still in progress, all control plane query packets from the host computer are forwarded to the peer switch for processing by the data plane using the tunneling method described herein. When the upgrade has finished and the CPU of the access switch has rebooted with the new software, the proxy service is stopped, as illustrated in step 513. The access switch will disable the tunneling function in its data plane circuitry so that it no longer encapsulates and forwards query packets to the peer switch. The access switch will also send a message to the peer switch to cease providing proxy service. The peer switch will disable the tunneling function in its data plane circuitry. The peer switch may also provide updated state information to the access switch, especially if the peer switch edited the state information during the period of time it was providing proxy service. The access switch can then provide normal control plane services to the host computer. In this manner, the data planes of the access switch and the peer switch are used to aid in providing control plane proxy services when the access switch is undergoing a software upgrade to its control plane.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method of providing control plane proxy service for an access switch serving a host computer, the method comprising:
   providing a peer switch with current state information of the host computer;
   encapsulating, by a first hardware circuit of the access switch during a control plane software upgrade of the first access switch, a control plane query packet sent from the host computer;
   forwarding the encapsulated control plane query packet to the peer switch using the first hardware circuit;
   receiving an encapsulated response to the control plane query packet from the peer switch using the first hardware circuit; and
   directing the response to the host computer.

2. The method of claim 1, wherein the first hardware circuit is an application specific integrated circuit.

3. The method of claim 1, wherein the current state information includes a plurality of addresses corresponding to ports of a plurality of network devices.

4. The method of claim 1, wherein the current state information includes the current state of a plurality of communications protocols that the host computer uses to communicate.

5. The method of claim 1, wherein the encapsulating the control plane query packet comprises encapsulating the control plane query packet in a header, wherein the header comprises the address of the access switch and the address of the peer switch.

6. The method of claim 1, wherein the peer switch has a second hardware circuit configured to:
   receive the encapsulated control plane query packet;
   decapsulate the control plane query packet;
   encapsulate the response to control plane query packet; and
   direct the response to the access switch.

7. The method of claim 6, wherein the second hardware circuit is an application specific integrated circuit.

8. The method of claim 6, wherein a control plane of the peer switch generates the response to the control plane query packet.

9. The method of claim 6, wherein the directing the response to the host computer comprises decapsulating the response using the first hardware circuit before directing the response to the host computer.

10. A method of upgrading control plane software of an access switch, the method comprising:
- identifying a peer switch that can provide proxy service to the access switch;
- providing the peer switch with current state information of a host computer;
- directing, while the access switch is being upgraded, a control plane query packet from the host computer to the peer switch by using a first hardware circuit of the access switch;
- receiving, while the access switch is being upgraded, a response to the control plane query packet from the peer switch using the hardware circuit;
- directing, while the access switch is being upgraded, the response to the host computer; and
- stopping proxy service when the access switch has finished upgrading.

11. The method of claim 10, wherein the first hardware circuit is an application specific integrated circuit.

12. The method of claim 10, wherein the directing the control plane query packet to the peer switch using the first hardware circuit comprises
- encapsulating the control plane query packet in a header, wherein the header comprises the address of the access switch and the address of the peer switch; and
- forwarding the encapsulated control plane query packet to the peer switch.

13. The method of claim 12, wherein the peer switch has a second hardware circuit configured to:
- receive the encapsulated control plane query packet;
- decapsulate the control plane query packet;
- encapsulate the response to control plane query packet; and
- direct the response to the access switch.

14. The method of claim 13, wherein the second hardware circuit is an application specific integrated circuit.

15. The method of claim 13, wherein a control plane of the peer switch generates the response to the control plane query packet.

16. The method of claim 13, wherein the directing the response to the host computer comprises decapsulating the response using the first hardware circuit before directing the response to the host computer.

17. The method of claim 10, wherein the current state information includes a plurality of addresses corresponding to ports of a plurality of network devices.

18. The method of claim 10, wherein the current state information includes the current state of a plurality of communications protocols that the host computer uses to communicate.

19. The method of claim 10, wherein stopping proxy service comprises:
- receiving a modified current state information from the peer switch; and
- configuring the first hardware circuit not to direct the control plane query packet to the peer switch.

20. A computing network system, the system comprising:
- a plurality of host computers; and
- a plurality of access switches, wherein during a control plane software upgrade of a first access switch in the plurality of access switches, the first access switch is configured to
  - receive a control plane query packet from a first host computer in the plurality of host computers;
  - direct the control plane query packet to a second access switch using a first hardware circuit of the first access switch;
  - receive a response to the control plane query packet from the second access switch using the first hardware circuit; and
  - send the response to the first host computer.

21. The system of claim 20, wherein the first hardware circuit is an application specific integrated circuit.

22. The system of claim 20, wherein the first access switch directs the control plane query packet to the second access switch by encapsulating the control plane query packet in a header and forwarding the encapsulated control plane query packet to the second access switch.

23. The system of claim 22, wherein the header comprises the address of the first access switch and the address of the second access switch.

24. The system of claim 22, wherein the second access switch has a second hardware circuit that is configured to:
- receive the encapsulated control plane query packet;
- decapsulate the control plane query packet;
- encapsulate the response to control plane query packet; and
- direct the response to the access switch.

25. The system of claim 24, wherein a control plane in the second access switch generates the response to the control plane query packet.

26. The system of claim 24, wherein the second hardware circuit is an application specific integrated circuit.

27. The system of claim 24, wherein the first hardware circuit decapsulates the response from the second access switch before sending the response to the first host computer.

28. The system of claim 20, wherein the first access switch sends current state information associated with the first host computer to the second access switch.

29. A non-transitory computer readable medium storing computer executable instructions, which, when executed by a processor, cause the processor to carry out a method for upgrading control plane software of an access switch, wherein the instructions comprise:
- instructions to identify a peer switch that can provide proxy service to the access switch;
- instructions to provide the peer switch with current state information of a host computer;
- instructions to direct, while the access switch is being upgraded, a control plane query packet from the host computer to the peer switch by using a first hardware circuit of the access switch;
- instructions to receive, while the access switch is being upgraded, a response to the control plane query packet from the peer switch using the hardware circuit;
- instructions to direct, while the access switch is being upgraded, the response to the host computer; and
- instructions to stop proxy service when the access switch has finished upgrading.

30. The non-transitory computer readable medium of claim 29, wherein the first hardware circuit is an application specific integrated circuit.

31. The non-transitory computer readable medium of claim 29, wherein the instructions to direct the control plane query packet to the peer switch using the first hardware circuit comprises
- instructions to encapsulate the control plane query packet in a header, wherein the header comprises the address of the access switch and the address of the peer switch; and
- instructions to forward the encapsulated control plane query packet to the peer switch.

32. The non-transitory computer readable medium of claim 31, wherein the peer switch has a second hardware circuit configured to:
- receive the encapsulated control plane query packet;

decapsulate the control plane query packet;
encapsulate the response to control plane query packet; and
direct the response to the access switch.

33. The non-transitory computer readable medium of claim 32, wherein the second hardware circuit is an application specific integrated circuit.

34. The non-transitory computer readable medium of claim 32, wherein a control plane of the peer switch generates the response to the control plane query packet.

35. The non-transitory computer readable medium of claim 32, wherein the instructions to direct the response to the host computer comprises instructions to decapsulate the response using the first hardware circuit before directing the response to the host computer.

36. The non-transitory computer readable medium of claim 29, wherein the current state information includes a plurality of addresses corresponding to ports of a plurality of network devices.

37. The non-transitory computer readable medium of claim 29, wherein the current state information includes the current state of a plurality of communications protocols that the host computer uses to communicate.

38. The non-transitory computer readable medium of claim 29, wherein the instructions to stop proxy service comprises:
  instructions to receive a modified current state information from the peer switch; and
  instructions to configure the first hardware circuit not to direct the control plane query packet to the peer switch.

* * * * *